United States Patent
Rodgers et al.

(10) Patent No.: US 9,461,825 B2
(45) Date of Patent: Oct. 4, 2016

(54) METHOD AND SYSTEM FOR PREVENTING REVOCATION DENIAL OF SERVICE ATTACKS

(75) Inventors: Stephane Rodgers, San Diego, CA (US); Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 1929 days.

(21) Appl. No.: 11/743,533

(22) Filed: May 2, 2007

(65) Prior Publication Data

US 2011/0197069 A9    Aug. 11, 2011

Related U.S. Application Data

(63) Continuation-in-part of application No. 10/769,173, filed on Jan. 30, 2004, now abandoned.

(60) Provisional application No. 60/828,585, filed on Oct. 6, 2006.

(51) Int. Cl.
 *H04L 9/32* (2006.01)
 *H04L 29/06* (2006.01)
 (Continued)

(52) U.S. Cl.
 CPC ........... *H04L 9/3247* (2013.01); *G06F 21/10* (2013.01); *G06F 21/64* (2013.01); *H04L 9/0891* (2013.01);
 (Continued)

(58) Field of Classification Search
 CPC ........... H04L 9/06; H04L 9/08; H04L 9/28; H04L 9/32; H04L 63/04; H04L 2209/60; H04L 2463/062; G06F 21/62; G06F 21/64; G06F 2211/007

USPC ............... 380/200–203, 239–242, 255, 259, 380/277–30, 277–286; 713/168, 176–180; 726/26–33; 705/50–59
See application file for complete search history.

(56) References Cited

U.S. PATENT DOCUMENTS

| | | | |
|---|---|---|---|
| 5,309,516 | A | 5/1994 | Takaragi et al. |
| 5,920,626 | A | 7/1999 | Durden et al. |

(Continued)

FOREIGN PATENT DOCUMENTS

| | | | |
|---|---|---|---|
| CN | 1254473 A | 5/2000 | |
| CN | 1471773 A | 1/2004 | |

(Continued)

OTHER PUBLICATIONS

Programmable read-only memory by Wikipedia; date: Feb. 16, 2005.*

(Continued)

*Primary Examiner* — Madhuri Herzog
(74) *Attorney, Agent, or Firm* — Sterne, Kessler, Goldstein & Fox PLLC

(57) ABSTRACT

Methods and systems for preventing revocation denial of service attacks are disclosed and may include receiving and decrypting a command for revoking a secure key utilizing a hidden key, and revoking the secure key upon successful verification of a signature. The command may comprise a key ID that is unique to a specific set-top box. A key corresponding to the command for revoking the secure key may be stored in a one-time programmable memory, compared to a reference, and the security key may be revoked based on the comparison. The command for revoking the secure key may be parsed from a transport stream utilizing a hardware parser. The method and system may also comprise generating a command for revoking a secure key. The command may be encrypted and signed utilizing a hidden key and may comprise a key ID that is unique to a specific set-top box.

28 Claims, 9 Drawing Sheets

(51) Int. Cl.
*G06F 21/64* (2013.01)
*G06F 21/10* (2013.01)
*H04L 9/08* (2006.01)
*G06F 21/62* (2013.01)
*H04L 9/28* (2006.01)

(52) U.S. Cl.
CPC .............. *H04L 9/32* (2013.01); *H04L 63/04* (2013.01); *H04L 63/0428* (2013.01); *H04L 63/0435* (2013.01); *G06F 21/62* (2013.01); *G06F 2221/0711* (2013.01); *G06F 2221/0771* (2013.01); *H04L 9/0822* (2013.01); *H04L 9/28* (2013.01); *H04L 2209/605* (2013.01); *H04L 2463/062* (2013.01)

(56) References Cited

U.S. PATENT DOCUMENTS

| | | | |
|---|---|---|---|
| 6,005,938 | A | 12/1999 | Banker et al. |
| 6,035,038 | A | 3/2000 | Campinos et al. |
| 6,073,237 | A | 6/2000 | Ellison |
| 6,144,743 | A | 11/2000 | Yamada et al. |
| 6,215,878 | B1 | 4/2001 | Harkins |
| 6,304,659 | B1 | 10/2001 | Gold et al. |
| 6,512,829 | B1 | 1/2003 | Nishioka et al. |
| 6,697,489 | B1 | 2/2004 | Candelore |
| 6,714,649 | B1 * | 3/2004 | Masuda et al. .................. 380/44 |
| 6,931,532 | B1 * | 8/2005 | Davis et al. .................. 713/167 |
| 7,024,553 | B1 | 4/2006 | Morimoto |
| 7,127,069 | B2 | 10/2006 | Nguyen |
| 7,143,438 | B1 | 11/2006 | Coss et al. |
| 7,257,616 | B2 | 8/2007 | Bass et al. |
| 7,296,147 | B2 * | 11/2007 | Matsuzaki et al. ........... 713/155 |
| 7,317,798 | B2 | 1/2008 | Saito |
| 7,493,661 | B2 | 2/2009 | Liu et al. |
| 9,094,699 | B2 | 7/2015 | Chen et al. |
| 2002/0001386 | A1 | 1/2002 | Akiyama |
| 2002/0094089 | A1 | 7/2002 | Kamiya et al. |
| 2002/0126843 | A1 * | 9/2002 | Murase et al. ................ 380/201 |
| 2002/0126847 | A1 | 9/2002 | Wajs et al. |
| 2002/0174366 | A1 | 11/2002 | Peterka et al. |
| 2002/0184512 | A1 | 12/2002 | Cardoso, Jr. |
| 2003/0037235 | A1 | 2/2003 | Aziz et al. |
| 2003/0061405 | A1 | 3/2003 | Fisher et al. |
| 2003/0108199 | A1 | 6/2003 | Pinder et al. |
| 2003/0221100 | A1 | 11/2003 | Russ et al. |
| 2004/0054792 | A1 | 3/2004 | Pitsos |
| 2004/0076120 | A1 | 4/2004 | Ishidoshiro |
| 2004/0177369 | A1 | 9/2004 | Akins, III |
| 2004/0237100 | A1 | 11/2004 | Pinder et al. |
| 2004/0243803 | A1 | 12/2004 | Codet et al. |
| 2005/0066355 | A1 | 3/2005 | Cromer et al. |
| 2005/0076138 | A1 | 4/2005 | Sterne |
| 2005/0084106 | A1 | 4/2005 | Venema et al. |
| 2005/0123135 | A1 * | 6/2005 | Hunt et al. .................... 380/200 |
| 2005/0172132 | A1 * | 8/2005 | Chen et al. .................... 713/180 |
| 2005/0177741 | A1 | 8/2005 | Chen et al. |
| 2013/0279691 | A1 | 10/2013 | Chen et al. |

FOREIGN PATENT DOCUMENTS

| | | |
|---|---|---|
| WO | WO 98/43426 A1 | 10/1998 |
| WO | WO 99/07150 A1 | 2/1999 |
| WO | WO 02/062054 A2 | 8/2002 |
| WO | WO 03/039153 A2 | 5/2003 |

OTHER PUBLICATIONS

What is a PROM; Published by Webopedia Computer Dictionary; Date: Feb. 1, 2001.*

Asano, Tomoyuki. "A revocation scheme with minimal storage at receivers." Advances in Cryptology—ASIACRYPT 2002. Springer Berlin Heidelberg, 2002. 433-450.*

European Search Report for European Patent Appl. No. 05000718.6, 5 pages, dated May 4, 2005.

English-language Abstract for Chinese Patent Publication No. CN 1254473 A, published May 24, 2000, 1 page.

English-language Abstract for Chinese Patent Publication No. CN 1471773 A, published Jan. 28, 2004, 1 page.

Chen, I. et al., U.S. Appl. No. 14/800,242, filed Jul. 15, 2015, entitled "System and Method for Security Key Transmission With Strong Pairing to Destination Client".

* cited by examiner

METHOD AND SYSTEM FOR PREVENTING REVOCATION DENIAL OF SERVICE ATTACKS

CROSS-REFERENCE TO RELATED APPLICATIONS/INCORPORATION BY REFERENCE

This application makes reference to, claims priority to, and claims the benefit of U.S. Provisional Application Ser. No. 60/828,585 filed on Oct. 6, 2006. The present application is a continuation-in-part of copending application Ser. No. 10/769,173, filed on Jan. 30, 2004 now abandoned.

The above referenced application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to encryption systems. More specifically, certain embodiments of the invention relate to a method and system for preventing revocation denial of service attacks.

BACKGROUND OF THE INVENTION

The implementation of fee-based video broadcasting requires a conventional conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, there may be a set of associated security keys that may be needed by the algorithm.

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access. An example of a multimedia system that may be accessed by many different users may be a set-top box where manufacturers, vendors, operators, and/or home users may have an interest in accessing or restricting at least some limited functionality of the system.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for preventing revocation denial of service attacks, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for preventing revocation denial of service attacks. Exemplary aspects of the invention include receiving and decrypting a secure key revocation command utilizing a hidden key, and revoking a security key upon successful verification of a signature. The secure key may be encrypted using an encryption key that may be unique to a specific set-top box. The received key revocation command may comprise a key ID that is unique to a specific set-top box. A key corresponding to the key revocation command may be stored in a one-time programmable memory, compared to a reference, and the security key may be revoked based on the comparison. The key revocation command may be parsed from a transport stream utilizing a hardware parser. The method and system may also comprise generating a secure key revocation command. The key revocation command may be encrypted and signed utilizing a hidden key and may comprise a key ID that is unique to a specific set-top box.

In conventional security key generation and transmission systems, a generated security key may be associated only with an address indicating the destination module that will utilize the security key. Strong pairing may be achieved by pairing the security key and its associated address with a security command, and subsequently transmitting the security key together with the security command and the associated address to a destination module. The security command may then be utilized by the destination module to ascertain the authenticity of the security key and compliance with applicable pairing rules.

Figure 1:
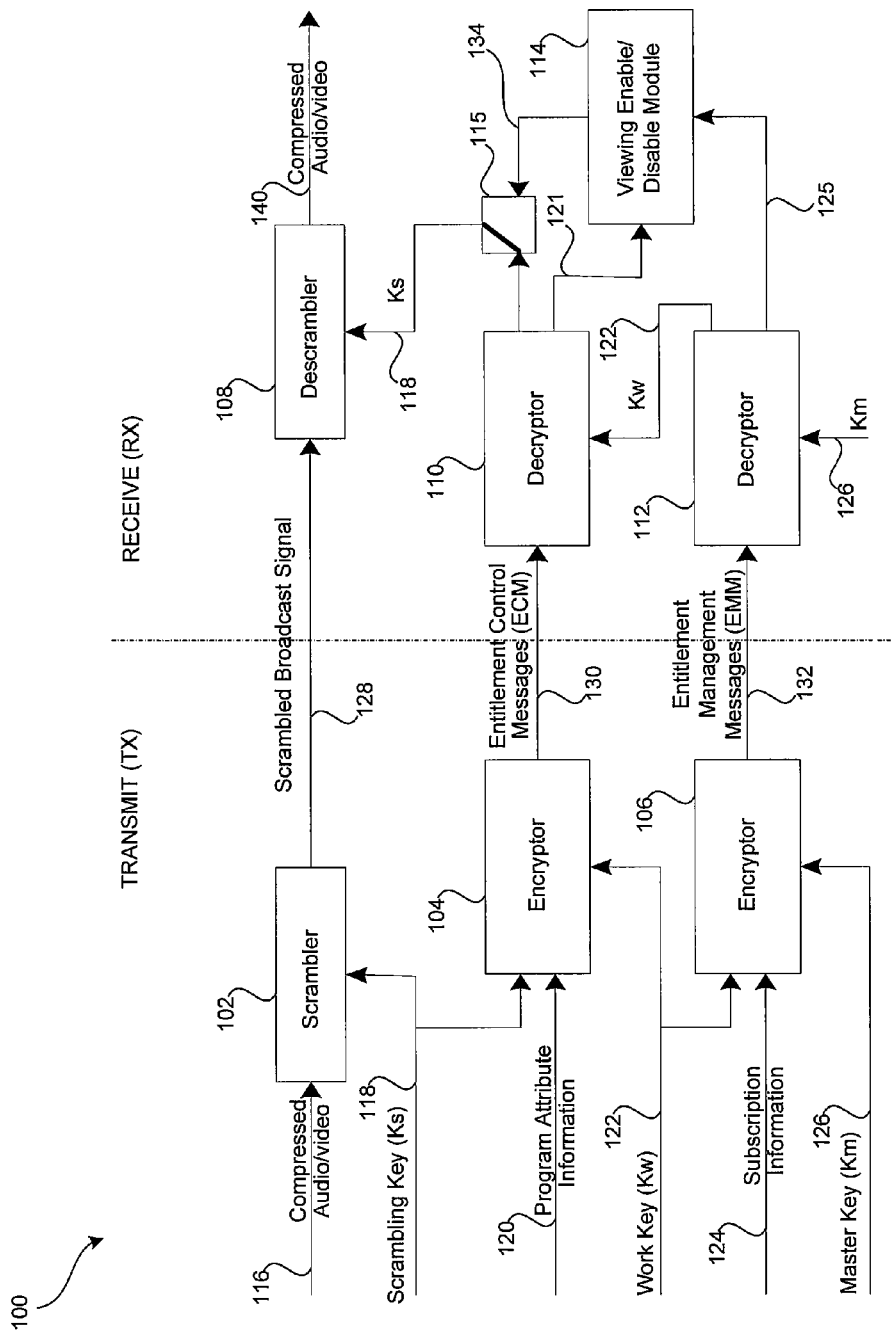
FIG. 1 is a block diagram illustrating a conditional access system utilizing a conventional key ladder system, in connection with an embodiment of the invention.

FIG. 1 is a block diagram illustrating a conditional access system utilizing a conventional key ladder system, in connection with an embodiment of the invention. The configuration of the CA system 100 in FIG. 1 has been recommended by International Telecommunications Union—Radio Communication Sector (ITU-R). Referring to FIG. 1, there is shown a block diagram of an exemplary conditional access system 100, which may include a scrambler 102, a descrambler 108, encryptors 104 and 106, decryptors 110 and 112, a switch 115, and a viewing enable/disable circuit 114. On the transmit side of the diagram, TX, the compressed audio/video signal 116 may be scrambled by the scrambler 102, utilizing a scrambling key Ks 118, in order to obtain a scrambled broadcast signal 128. Program attribute information 120 may be encrypted by the encryptor 104, utilizing a work key Kw 122, to obtain the entitlement control messages 130. Program subscription information 124 may be encrypted by the encryptor 106, utilizing a master key 126, to obtain the entitlement management messages 132.

During signal scrambling in the CA system 100, the scrambling key Ks 118 may determine the scrambling pattern. The scrambling key may be changed at fixed intervals of time, such as every few seconds, to maintain a secure system. The scrambling key 118 has to be continuously transmitted to the subscriber's receiver. This may be achieved in the CA system 100 by encrypting the scrambling key 118 by the encryptor 104 and transmitting it within the entitlement control messages 130. The ECM 130 may also comprise the program attribute information 120. The program attribute information 120 may be utilized, for example, for determining whether a subscriber is entitled to view a program on the basis of his or her subscription. To prevent the ECM 130, which may include the scrambling key 118, from being understood by a third party, the ECM 130 may be encrypted by the encryptor 104 before transmission, by utilizing the work key Kw 122. The work key 122 may be updated on a monthly or yearly basis. The work key 122 may be sent to the receiver through the entitlement management messages 132, together with the subscription information 124. The subscription information 124 may also contain any subscription updates for the specific subscriber.

Besides being transmitted in-band, the EMM 132 may be transmitted out-of-band utilizing other media like the Internet, telephone lines, a signaling network, or a smart card, for example. Prior to transmission, the EMM 132 may be encrypted by a master key Km 126. A master key may be unique to each receiver and its security commonly managed among different broadcast operators that use the same type of receiver. This normally may be accomplished by setting up an organization for uniform key management. For example, in the CA system 100 illustrated in FIG. 1, the content scrambling key 118 may be protected by the work key 122, which in turn may be protected by the master key 126. This key protection "chain" is, sometimes, referred to as a key ladder.

On the receive side of the diagram, RX, the same key ladder may be utilized in order to decrypt the necessary secure keys and scrambled broadcast audio/video signals 128. The master key 126 may be utilized with the decryptor 112 in order to decrypt the EMM 132 and the work key 122. As a result, the work key 122 may be obtained as one of the outputs from the decryptor 112. The decrypted work key 122 may then be utilized by the decryptor 110 to decrypt the ECM 130 and the scrambling key 118. As a result, the scrambling key 118 may be obtained as one of the outputs from the decryptor 110. The decrypted scrambling key 118 may then be utilized by the descrambler 108 to descramble the scrambled broadcast signal 128 and obtain the compressed audio/video output 140.

Access to the compressed audio/video output 140 by a user may be determined in accordance with the user's subscription information 124 and the program attribute information 120. The decryptor 112 decrypts the EMM 132 to obtain decrypted subscription information 125. The decryptor 110 decrypts the ECM 130 to obtain decrypted program attribute information 120. The viewing enable/disable module 114 receives the decrypted subscription information 125 and the decrypted program attribute information 121 and may then determine whether or not a user may be entitled to receive the compressed audio/video output 140. If the user is entitled to receive the compressed audio/video output 140 (for example, the user has a valid subscription for a given programming channel), then the viewing enable/disable module 114 issues a control signal 134 activating the switch 115. Once the switch 115 is activated, this allows for the decrypted scrambling key 118 to be entered into the descrambler 108, which in turn allows for the descrambling of the compressed audio/video output 140.

Figure 2:
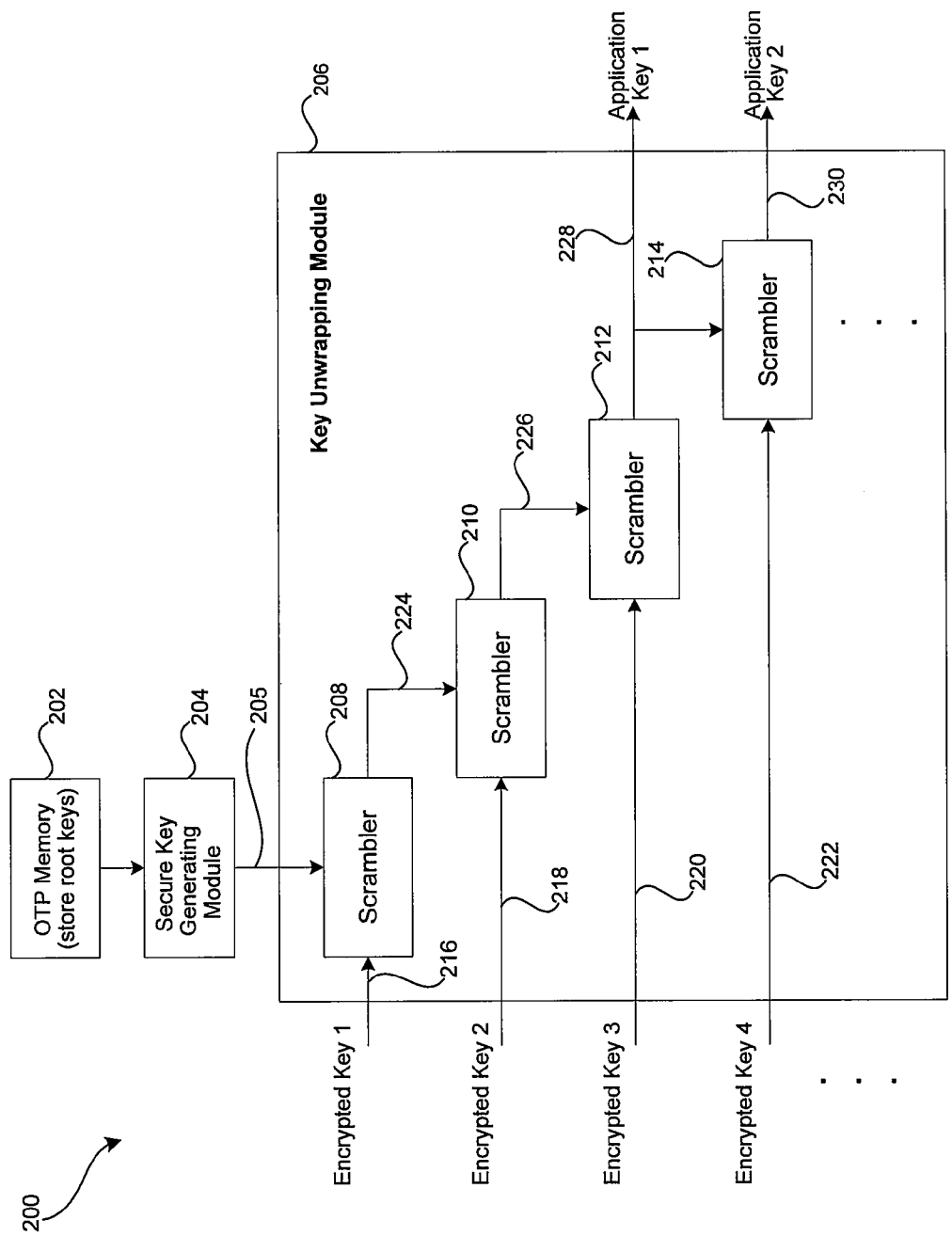
FIG. 2 is a block diagram illustrating secure key unwrapping in a conventional key ladder system, in connection with an embodiment of the invention.

FIG. 2 is a block diagram illustrating secure key unwrapping in a conventional key ladder system, in connection with an embodiment of the invention. Referring to FIG. 2, there is shown key ladder system 200 comprising a one time programmable (OTP) memory 202, a secure key generating module 204 and a key unwrapping module 206. The key unwrapping module 206 may comprise scramblers 208, 210, 212 and 214. Each of the scramblers 208, 210, 212 and 214 may utilize a symmetric encryption algorithm, for example a Data Encryption Standard (DES), a 3DES, or an Advanced Encryption Standard (AES) type of algorithm, in order to descramble an encrypted key input. The OTP memory 202 in the key ladder system 200 may be enabled to store a root key, for example a key such as the master key 126 in FIG. 1. The root key stored in the OTP memory 202 may be further protected by the secure key-generating module 204. The secure key-generating module 204 may comprise suitable circuitry, logic and/or code that may be enabled to scramble, or otherwise further enhance the security of the root key stored in the OTP memory 202.

The key unwrapping module 206 may be enabled to "unwrap," or descramble, various application keys, for example, application key 1, 228, and application key 2, 230. In order to achieve this, the key unwrapping module 206 may utilize several encrypted keys, for example, encrypted key 1, 216, encrypted key 2, 218, encrypted key 3, 220, and encrypted key 4, 222. Once the root key stored in the OTP memory 202 may be scrambled by the secure key-generating module 204, the scrambled root key 205 may be utilized by the scrambler 208 in order to decrypt the encrypted key 1, 216, and generate a decrypted key 224. The decrypted key 224 may comprise, for example, a work key. The decrypted key 224 may be utilized by the scrambler 210 in order to decrypt encrypted key 2, 218, and generate the decrypted key 226. The decrypted key 226 may comprise, for example, a scrambling key.

The decrypted key 226 may be utilized by the scrambler 212 in order to decrypt encrypted key 3, 220, and generate the decrypted application key 1, 228. Similarly, the decrypted application key 228 may be utilized by the scrambler 214 in order to decrypt encrypted key 4, 222, and generate the decrypted application key 2, 230. Decrypted application keys 228 and 230 may be further utilized for various functions, for example, for copy protection of broadcast signals. The key ladder in the key unwrapping module 206 may be enabled to have varying levels of protection by increasing the number of the encrypted keys and the corresponding scramblers, and by utilizing each previously decrypted application key in a subsequent decryption of a following encrypted key. The key ladder may be utilized to "unwrap" a master key, a work key and a scrambling key. The master key, work key and scrambling key may then be utilized to decrypt one or more application keys.

Even though the key unwrapping module 206 may provide an increasing level of protection by increasing the number of scramblers and encrypted keys, it may sometimes be difficult to determine whether or not the received encrypted keys in the key ladder system 200 of FIG. 2 have been manipulated by unauthorized parties.

When encrypted data is transmitted over an insecure channel, the transmitting and/or the receiving party may need the ability to monitor such communication and obtain verification of the identity of the other party, and of the integrity and origin of the encrypted data that was transmitted.

With either a conditional access system or a copy protection system, security keys may be generated either on the transmit or the receive side of a fee-based video broadcasting system. The generated security keys may be utilized in the encryption/decryption of other keys, for example. In order for a security key to be properly utilized by a destination module, the security key may be paired with address information of the destination module it is intended for. The security key data path from generation, distribution and use by a destination module, however, may be susceptible to security breach since the only pairing used may be the addressability of the security key to the destination module.

In instances where the receiving system may become untrusted, such that the service provider would like to change the second tier keys to control the access available to the receiving system, a revocation of the old keys and a download of new keys may provide this function. In a conventional system, such as the key ladder system 200, software may be utilized to burn an OTP bit in the OTP memory 202, for example, to indicate that a corresponding key may no longer be used. However, an attacker may cause the receiving system to completely fail by revoking all the keys and burning all the OTP bits used for revoking bits.

Figure 3:
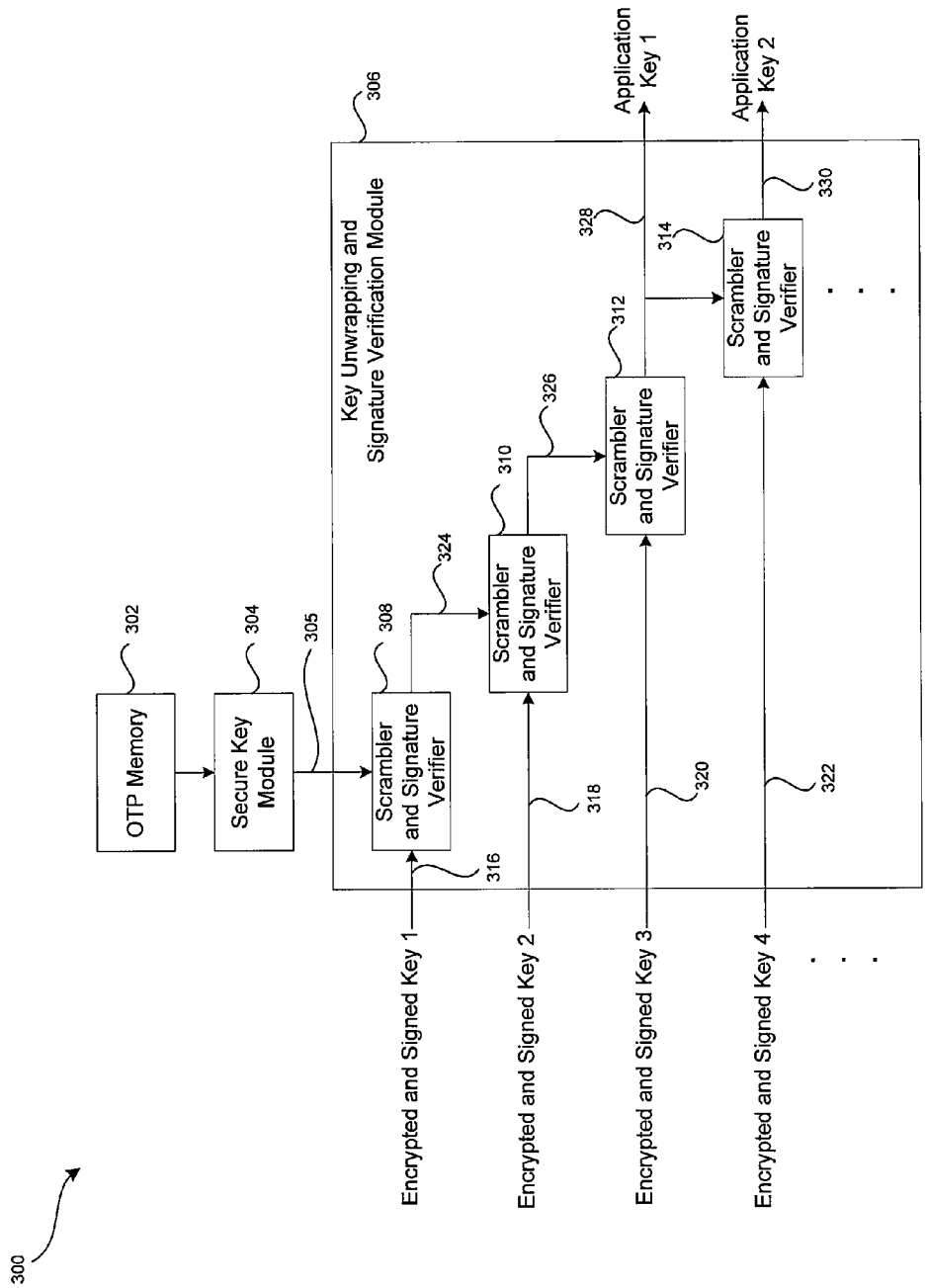
FIG. 3 is a block diagram illustrating an exemplary secure key unwrapping and signature verification system, in accordance with an embodiment of the invention.

FIG. 3 is a block diagram illustrating an exemplary secure key unwrapping and signature verification system, in accordance with an embodiment of the invention. Referring to FIG. 3, the key ladder system 300 may comprise a one time programmable (OTP) memory 302, a secure key generating module 304 and a key unwrapping and signature verification module 306.

The key unwrapping and signature verification module 306 may be enabled to "unwrap", or descramble, various application keys, for example, application key 1, 328, and application key 2, 330. In order to achieve this, the key unwrapping and signature verification module 306 may utilize several encrypted and signed keys, for example, the encrypted and signed key 1, 316, the encrypted and signed key 2, 318, the encrypted and signed key 3, 320, and the encrypted and signed key 4, 322. In accordance with an aspect of the present invention, the encrypted and signed keys 316, 318, 320 and 322 may have been initially signed by a transmitting entity utilizing an asymmetric encryption algorithm, such as a public key algorithm, for example, a Rivest-Shamir-Adleman (RSA), a Digital Signature Algorithm (DSA), or an Elliptic Curve Cryptography (ECC) type of algorithm. The signed keys may then have been encrypted utilizing a symmetric encryption algorithm, such as a DES, a 3DES, or an AES type of algorithm.

The key unwrapping and signature verification module 306 may comprise scrambler and signature verifiers 308, 310, 312 and 314. Each of the scrambler and signature verifiers 308, 310, 312 and 314 may comprise suitable circuitry, logic and/or code that may be enabled to utilize a symmetric encryption algorithm, for example a DES, a 3DES, or an AES type of algorithm, in order to descramble an encrypted and signed key input. Each of the scrambler and signature verifiers 308, 310, 312 and 314 may also be enabled to utilize a public key algorithm, for example an RSA, a DSA, or an ECC type of algorithm, in order to verify a decrypted signed key.

The OTP memory 302 in the key ladder system 300 may be enabled to store a root key, for example a master key. The root key stored in the OTP memory 302 may be further protected by the secure key-generating module 304. The secure key-generating module 304 may comprise suitable circuitry, logic and/or code that may be enabled to scramble, or otherwise further enhance the security of the root key stored in the OTP memory 302.

Once the root key stored in the OTP memory 302 gets scrambled by the secure key-generating module 304, the scrambled root key 305 may be utilized by the scrambler and signature verifier 308 in order to decrypt and verify the signature of the encrypted and signed key 1, 316. In this manner, the generated decrypted key 324 may be verified. The decrypted and verified key 324 may comprise, for example, a work key. The decrypted and verified key 324 may be utilized by the scrambler and signature verifier 310 in order to decrypt and verify the signature of the encrypted and signed key 2, 318, and to generate the decrypted and verified key 326. The decrypted and verified key 326 may comprise, for example, a scrambling key.

The decrypted and verified key 326 may be utilized by the scrambler and signature verifier 312 in order to decrypt and verify the signature of the encrypted and signed key 3, 320, and to generate the decrypted and verified application key 1, 328. Similarly, the decrypted and verified application key 328 may be utilized by the scrambler and signature verifier 314 in order to decrypt and verify the signature of the encrypted and signed key 4, 322, and to generate the decrypted and verified application key 2, 330. Decrypted and verified application keys 328 and 330 may be further utilized for various functions, for example, for copy protection of broadcast signals, or for establishing the trustworthiness of a key revocation command from an assumed trusted source.

In accordance with an aspect of the present invention, the key ladder in the key unwrapping and signature verification module 306 may be enabled to have varying levels of protection by increasing the number of the encrypted and signed keys and the corresponding scramblers, and by utilizing each previously decrypted and verified application key in a subsequent decryption of a following encrypted and signed key. The key ladder may be utilized to "unwrap" a signed and encrypted master key, a signed and encrypted work key and a signed and encrypted scrambling key. The master key, work key and scrambling key may then be utilized to decrypt one or more application keys.

In accordance with an embodiment of the invention, strong pairing may be utilized in the secure key unwrapping and signature verification system 300. More specifically, strong pairing may be utilized along the security key data path from the OTP memory 302, where root keys are stored, up until application keys 328 and 330 are generated in the key unwrapping and signature verification module 306. In addition, by verifying the encrypted and signed keys, the secure key unwrapping and signature verification system 300 may be utilized to enhance security against a revocation denial of service attack.

Figure 4A:
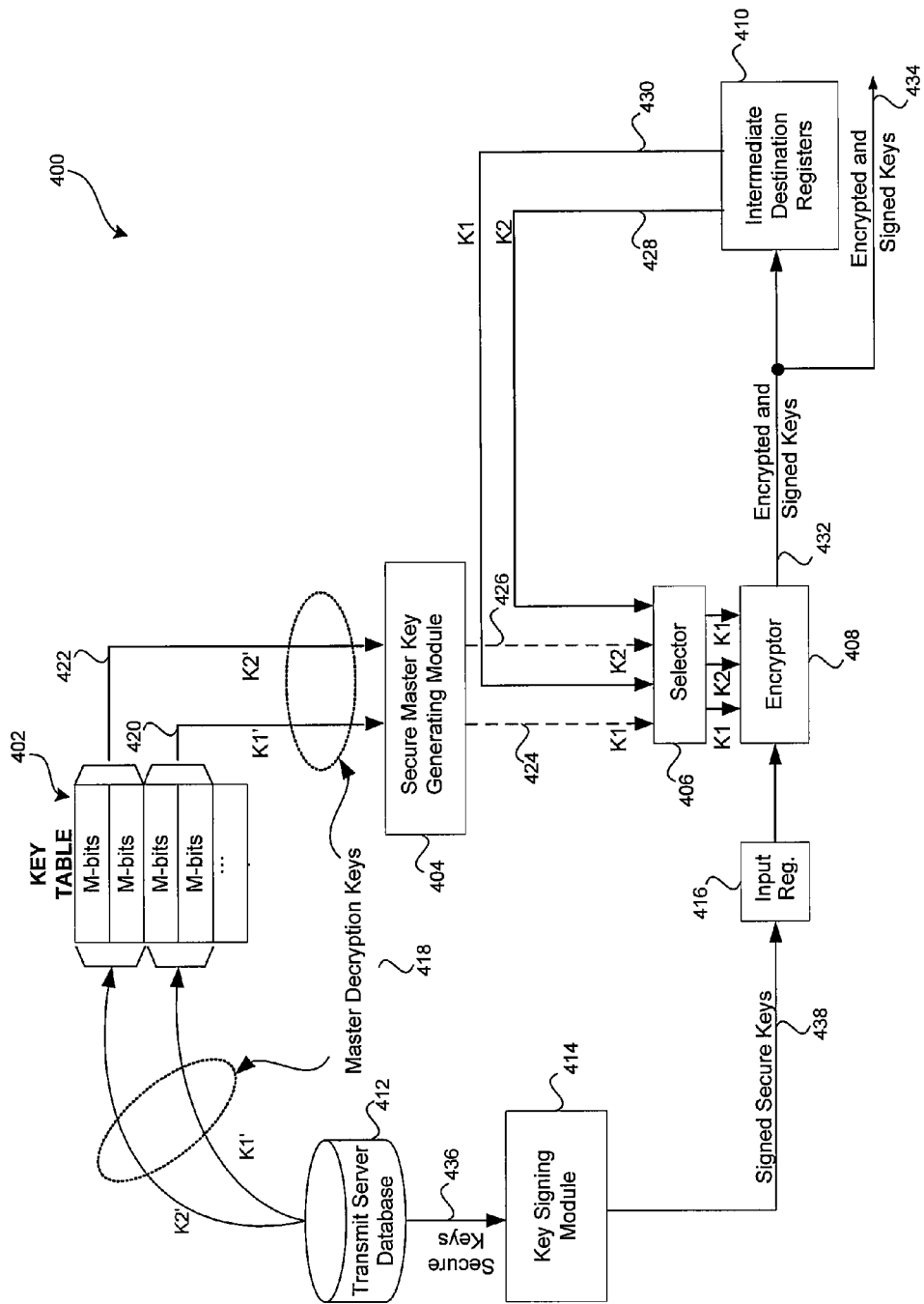
FIG. 4A illustrates a block diagram of an exemplary system for secure key generation, secure key signing and secure key encryption, in accordance with an embodiment of the invention.

FIG. 4A illustrates a block diagram of an exemplary system for secure key generation, secure key signing and secure key encryption, in accordance with an embodiment of the invention. Referring to FIG. 4A, the exemplary system 400 may comprise a key table 402, a transmit server database 412, a key signing module 414, an input register 416, a secure master key generating module 404, a selector 406, an encryptor 408, and intermediate destination registers 410.

The transmit server database 412 may comprise suitable circuitry, logic and/or code that may be enabled to generate a plurality of secure keys, for example, the master decryption keys 418. Master decryption keys 418 may comprise a master key K1' 420 and a master key K2' 422. In accordance with an aspect of the invention, the master decryption keys 418 may be utilized for the encryption and decryption of one or more secure keys, for example, a work key, a scrambling key and/or a revocation key.

Once the master decryption keys 418 are generated by the transmit server database 412, the master decryption keys 418 may be stored in a key table 402. Each of the master decryption keys 420 and 422 may comprise a fixed number of bits. For example, master decryption keys 420 and 422 may each occupy two M-bit cells in the key table 402. The key table 402 may be part of a random access memory (RAM), such as a DRAM or SRAM, for example. The key table 402 may also be enabled to store a plurality of master decryption keys.

Once the master decryption keys are stored in the key table 402, the master decryption keys 418 may be sent to the secure master key generating module 404. The secure master key generating module 404 may comprise suitable circuitry, logic and/or code that may be enabled to further enhance the security of master decryption keys K1' 420 and K2' 422. In accordance with an aspect of the invention, the secure master key generating module 404 may comprise an encryptor and/or a scrambler. The secure master key generating module 404 may enhance the security of master decryption keys K1' 420 and K2' 422, and may generate a secure master decryption key K1 424 and a secure master decryption key K2 426.

The transmit server database 412 may also generate a plurality of secure keys 436, which may be communicated from the transmit server database 412 to the key signing module 414. The key-signing module 414 may comprise suitable circuitry, logic and/or code that may be enabled to "sign" the secure keys 436 and generate signed secure keys 438. In accordance with an aspect of the invention, the key-signing module 414 may utilize a symmetric encryption algorithm and/or an asymmetric encryption algorithm to generate the signed secure keys 438. The signed secure keys 438 may then be stored in the input register 416, prior to being communicated to the encryptor 408.

The selector 406 may comprise suitable circuitry, logic and/or code that may be enabled to select from one or more inputs and generate one or more outputs. In accordance with an aspect of the present invention, the selector 406 may be a 2:1 selector and may generate three outputs from any two received inputs. For example, the secure master decryption keys 424 and 426 may be utilized by the selector 406 as inputs to generate an output with the secure master decryption key 424 selected twice and the secure master decryption key 426 selected once.

The encryptor 408 may comprise suitable circuitry, logic and/or code that may be enabled to encrypt any of the signed secure keys 438. In accordance with an aspect of the invention, the encryptor 408 may comprise a 3DES-Encrypt-Decrypt-Encrypt (EDE) or Decrypt-Encrypt-Decrypt (DED) encryption engine. The encryptor 408 may utilize the secure master decryption key output from the selector 406 and encrypt the signed secure keys 438 to obtain encrypted and signed keys 432.

The encrypted and signed keys 432 may be copied to intermediate destination registers 410 and may be subsequently utilized by the selector 406 and the encryptor 408 for encryption of subsequent signed secure keys 438. For example, the secure master decryption keys 424 and 426 may be utilized by the selector 406 and the encryptor 408 only once, for the encryption of a first pair of signed secure keys received by the encryptor 408. The resulting encrypted and signed secure keys 428 and 430 may be stored in intermediate destination registers 410 prior to their utilization by the selector 406 and the encryptor 408 for the encryption of a second, subsequent pair of signed secure keys.

As the key generation, signing and encryption system 400 generates encrypted and signed keys 432, the secure key ladder protection increases since the number of generated encrypted and signed keys 432 increases. As the encrypted and signed keys 432 are generated, they may be transmitted to an output location 434. In this manner, a transport system may be further strengthened against revocation denial of service attacks, as an attacker may not possess the proper public key and a hidden key specific to the receiver. In addition, even if an attacker did intercept an encrypted and signed key, it may be encrypted a number of times, and may not work on any other system, or even the intended receiving system again, as it may only be valid once or for a limited duration.

In accordance with an embodiment of the invention, strong pairing may be utilized in the exemplary system 400 for secure key generation, secure key signing and secure key encryption. More specifically, strong pairing may be utilized along the security key data path from the moment security keys are generated by the transmit server database 412, or the secure master key generating module 404, until encrypted and signed security keys are transmitted out from the output location 434.

Figure 4B:
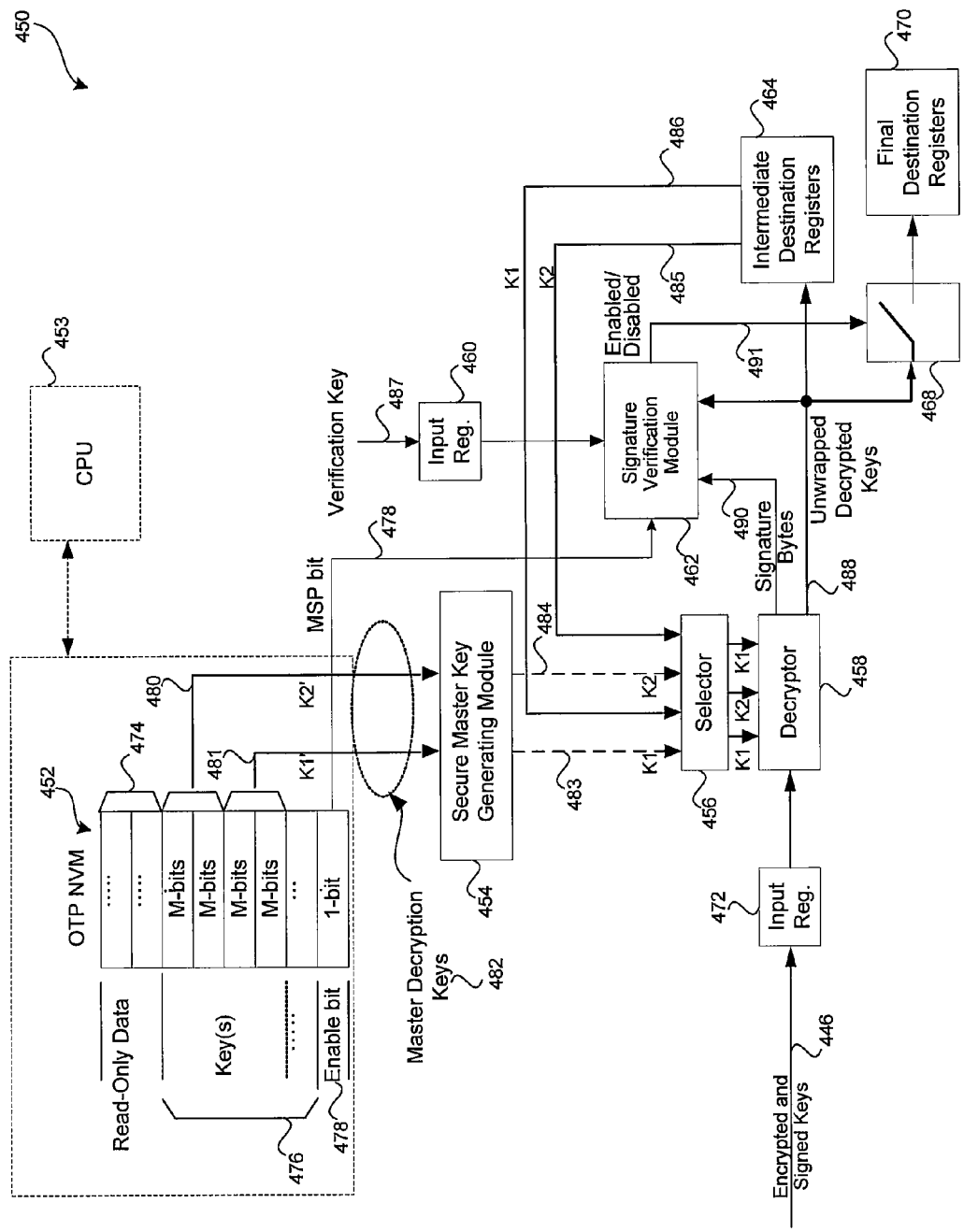
FIG. 4B is a block diagram of an exemplary system for secure key decryption and secure key signature verification, in accordance with an embodiment of the invention.

FIG. 4B is a block diagram of an exemplary system for secure key decryption and secure key signature verification, in accordance with an embodiment of the invention. Referring to FIG. 4B, there is shown exemplary system 450 comprising a one-time programmable non-volatile memory (OTP NVM) 452, a secure master key generating module 454, a CPU 453, an input register 472, a selector 456, a decryptor 458, an input register 460, a signature verification module 462, an intermediate destination register 464, a switch 468 and final destination registers 470.

The OTP NVM 452 may comprise a random access memory (RAM), such as a DRAM or SRAM, for example. The OTP NVM 452 may be enabled to store, for example, read-only data 474, keys 476, and an enable bit 478. The keys 476 may comprise master decryption keys 481 and 480. The master decryption keys 481 and 480 may each occupy, for example, an even number of bits in the OTP NVM 452. In accordance with an exemplary embodiment of the invention, the master decryption keys 480 and 481 may each occupy two M-bit cells in the OTP NVM 452. The read-only data 474 of the OTP NVM 452 may comprise chip identification information and other read-only information that may be accessed by the CPU 453. The CPU 453 may be, for example, a microprocessor, a MIPS, a microcontroller or other type of processor.

The master decryption keys 480 and 481 may be communicated to the secure master key generating module 454. The secure master key generating module 454 may comprise suitable circuitry, logic and/or code that may be enabled to further enhance the security of the master decryption keys 480 and 481. In accordance with an aspect of the invention, the secure master key generating module 454 may comprise an encryptor, or a scrambler, that may receive master decryption keys 482 as input. Master decryption keys 482 may comprise master decryption key 480 and master decryption key 481. The secure master key generating module 454 may enhance the security of master decryption key 480 and master decryption key 481 and may generate a secure master decryption key K1 483 and secure master decryption key K2 484.

The selector 456 may comprise suitable circuitry, logic and/or code that may be enabled to select from one or more inputs and generate one or more outputs. In accordance with an aspect of the invention, the selector 456 may be, for example, a 2:1 selector and may generate three outputs from any two received inputs. For example, the secure master decryption keys K1 and K2, 483 and 484 respectively, may be utilized by the selector 456 as inputs to generate an output. For example, the secure master decryption key 483 may be selected twice and the secure master decryption selected once.

The secure key decryption and secure key signature verification system 450 may be enabled to receive encrypted and signed keys 446. The encrypted and signed keys 446 may be generated, for example, by a secure key generation, secure key signing and secure key encryption system, such as the system illustrated in FIG. 4A. Once received by the secure key decryption and secure key verification system 450, the encrypted and signed keys 446 may be stored in an input register 472. The encrypted and signed keys 446 may then be transmitted to the decryptor 458. In accordance with an aspect of the invention, the encrypted and signed keys 446 may comprise multiples of 64-bits, for example, and may include an encrypted key, a key destination and/or a key signature.

The decryptor 458 may comprise suitable circuitry, logic and/or code that may be enabled to decrypt any of the encrypted and signed keys 446. In accordance with an aspect of the invention, the encryptor 458 may comprise a 3DES-Encrypt-Decrypt-Encrypt (EDE) and/or Decrypt-Encrypt-Decrypt (DED) decryption engine. The decryptor 458 may utilize the secure master decryption keys K1 and K2, 483 and 484 respectively, generated as an output of the selector 456. The decryptor 458 may generate as an output, the unwrapped decrypted keys 488 and signature bytes 490.

In operation, the unwrapped decrypted keys 488 may be communicated to the intermediate destination registers 464, and may subsequently be utilized by the selector 456 and the decryptor 458 for decryption of subsequent encrypted and signed keys 446. For example, the secure master decryption key K1 483 and the secure master decryption key K2 484 may be utilized by the selector 456 and the decryptor 458 only once, for the decryption of a first pair of encrypted and signed keys 446 that may be received by the decryptor 458. The resulting unwrapped decrypted keys K1 486 and K2 485 may be stored in the intermediate destination registers 464. The unwrapped decrypted keys 485 and 486 may then be utilized by the selector 456 and decryptor 458 for the decryption of a second subsequent pair of encrypted and signed keys 446 that may be received by the decryptor 458. This loop process may continue until the encrypted and signed keys of the received key ladder are unwrapped and decrypted.

After decryption of the encrypted and signed keys 446 by the decryptor 458, the signature bytes 490 of each of the encrypted and signed keys may be generated as an output from the decryptor 458. The signature bytes 490 may be communicated to the signature verification module 462. The signature verification module 462 may comprise suitable circuitry, logic and/or code that may be enabled to verify the authenticity of the signature bytes 490. In accordance with an aspect of the invention, the signature verification module 462 may utilize an asymmetric encryption algorithm, such as a public key encryption algorithm, in order to verify the received signature bytes 490. A verification key 487 may be loaded by the CPU 453. A verification key 487 may comprise for example, a public key that may be utilized to verify the signature bytes 490. The verification key 487 may be initially stored in an input register 460. The signature verification module 462 may utilize the verification key (public key) 487 in order to verify the received signature 490. As a result, an enabled/disabled signal 491 may be generated by the signature verification module 462. The enabled/disabled signal 491 may then be communicated to the switch 468.

The switch 468 may receive the unwrapped decrypted key 488 and may allow, or reject, a further transmission of the unlocked decrypted keys 488 through the final destination registers 470. If the enabled/disabled signal 491 comprises an enabled command, the unwrapped decrypted key 488 may be transmitted to the final destination registers 470 for any further processing. If the command 491 comprises a disable command, then the unwrapped decrypted keys 488 may not be transmitted to the final destination registers 470. A enabled/disabled signal 491 may comprise a disable command if, for example, the signature verification module 462 ascertains that the signature 490 is not verified. The signature 490 may be unverifiable if, for example, the encrypted and signed keys 446 had been manipulated by an attacker during their transmission to the secure key decryption and secure key verification system 450, or were transmitted to attempt a denial of service attack, by generating a security key revocation command. Verification of the signature 490 by the signature verification module 462 may be enabled or disabled with the help of the enable bit 478. The enable bit 478 may comprise a multi-stage programming (MSP) bit. For example, an enable bit 478 may be set to a predetermined value so that the signature verification module 462 may be activated and the signature 490 may be verified. In this manner, revocation denial of service attacks may be averted by requiring the appropriate signature before enabling any further communication of received signals, by utilizing a hardware enabled security check. Changes may not be allowed to the receiving systems unless both public and hidden keys are known for the key that may be revoked.

In an embodiment of the invention, cryptography algorithms may be utilized to encrypt and/or decrypt data. In addition, security keys may be utilized to enhance the authentication process. A strong pairing may exist between the various keys and the destination modules where the keys may be used. This strong pairing may be utilized to add more security and authenticity in the transmission of a security key to the destination module associated with the key. For example, strong pairing may be utilized in the secure key decryption and secure key verification system 450. More specifically, strong pairing may be utilized along the security key data path from the moment security keys are received by the input register 472, or generated by the secure master key generating module 454, until unwrapped and decrypted keys are communicated to the final destination registers 470.

Figure 5:
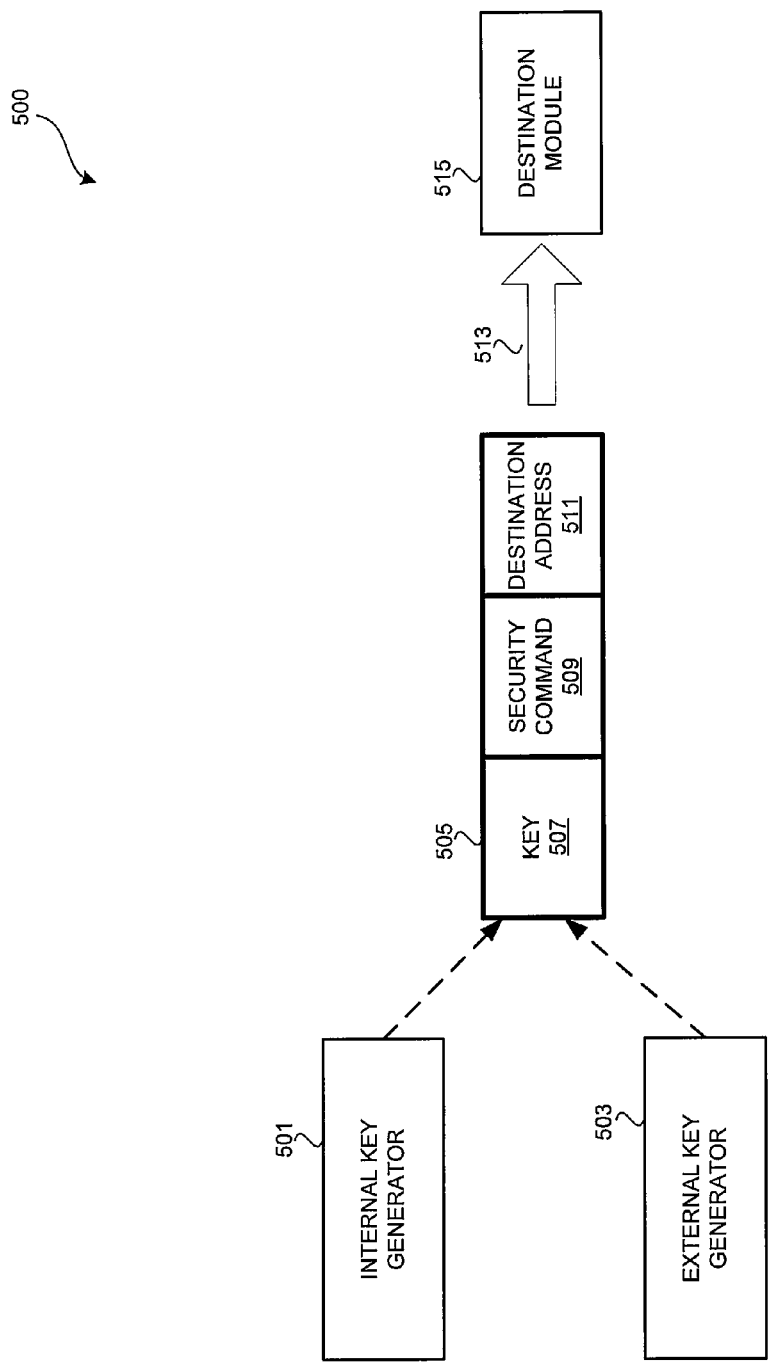
FIG. 5 is a block diagram of an exemplary system 500 for security key generation and transmission with strong pairing to destination client, in accordance with an embodiment of the invention.

FIG. 5 is a block diagram of an exemplary system 500 for security key generation and transmission with strong pairing to destination client, in accordance with an embodiment of the invention. Referring to FIG. 5, the system 500 may comprise an internal key generator 501, an external key generator 503, a security key sequence 505, and a destination module 515. The security key sequence 505 may comprise a security key 507, which may be paired with a security command 509 and a destination address 511. The internal key generator 501 may be disposed within a circuit utilizing a security key, such as an application specific integrated circuit (ASIC), for example, and may comprise suitable circuitry, logic and/or code that may be enabled to generate security keys. The external key generator 503 may be disposed outside the circuit utilizing a generated security key, for example, and may comprise suitable circuitry, logic and/or code that may be enabled to generate security keys.

In operation, a security key 507 may be generated by the internal key generator 501 or by the external key generator 503. The generated security key 507 may be associated with a destination address 511 indicating the destination module 515. The key 507 and its associated destination address 511 may be paired with the security command 509 to form the security key sequence 505. The security command 509 may comprise a rule, and the rule may be associated with characteristics of the destination module 515, for example. Alternatively, the security command 509 may comprise a security key revocation command to remove the accepted authority on a set top box in cases where the set top box may be compromised or hacked. In addition, the security command 509 may relate to attributes and/or permissible usages of the security key 507 that may be transmitted along with it. The security command 509 may include the encryption/decryption method for which the security key 507 may be used, the size of the security key 507, and/or information on the method used to calculate the security key 507.

After the security key sequence 505 is formed, it may be communicated to the destination module 515 via the transmission bus 513. The transmission bus 513 may comprise a serial transmission bus, for example. In an aspect of the invention, multiple destination modules may receive a security key sequence, such as the security key sequence 505, and it may be determined on the basis of the security command within the security key sequence, which destination module is to process the received security key.

Strong pairing between the source of the security key 507 and the destination module 515 may be achieved by the pairing of the security key 507 and the destination address 511 with the security command 509 prior to communicating the security key sequence 505 to the destination module 515. The pairing of the security key 507 with destination-related characteristics indicated by the security command 509, may provide a strong pairing for the entire security key data path in the system 500, from generation of the security key 507, distribution (communication) of the security key 507, and use of the security key 507 by the destination module 515.

Figure 6:
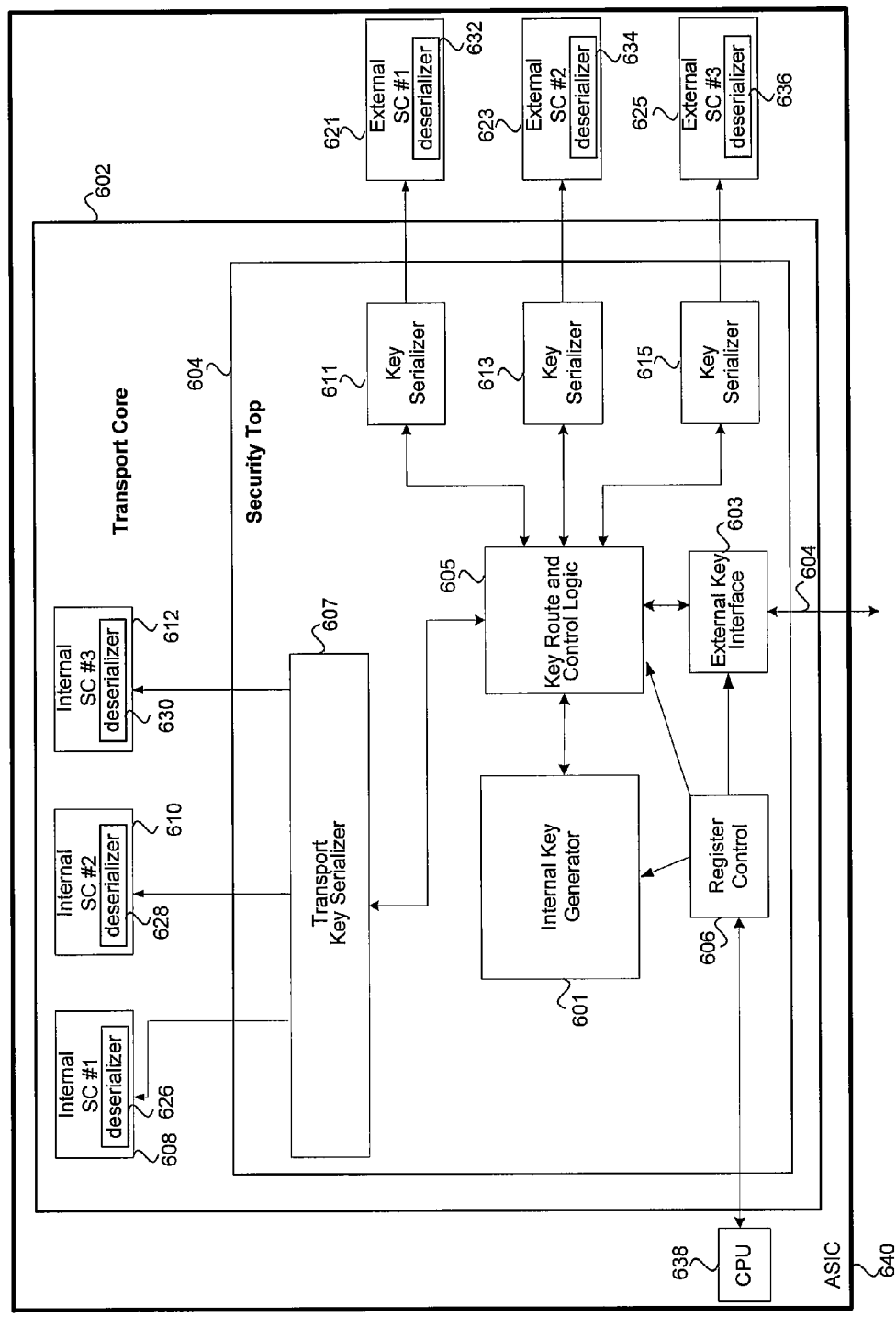
FIG. 6 is a block diagram illustrating exemplary security architecture in an application specific integrated circuit (ASIC) utilizing a security key generation and transmission system, in accordance with an embodiment of the invention.

FIG. 6 is a block diagram illustrating exemplary security architecture in an application specific integrated circuit (ASIC) utilizing a security key generation and transmission system, in accordance with an embodiment of the invention. Referring to FIG. 6, the ASIC 640 may comprise a CPU 638, a transport core 602, and external security clients 621, 623, and 625. The external security clients 621, 623, and 625 may comprise deserializers 632, 634, and 636, respectively. The transport core 602 may comprise a security top 604 and internal security clients 608, 610, and 612. The internal security clients 608, 610, and 612 may comprise deserializers 626, 628, and 630, respectively. The security top 604 may comprise a transport key serializer 607, an internal key generator 601, a register control 606, a key route and control logic 605, an external key interface 603, and key serializers 611, 613, and 615.

A set-top box (STB) may comprise an ASIC, such as the ASIC 640, and the ASIC may be enabled to utilize a security key generation and transmission system, such as the security key generation and transmission system described with respect to FIG. 4A, to achieve strong pairing and to eliminate revocation denial of service attacks on a destination client. The ASIC 640 may comprise suitable circuitry, logic and/or code that may be enabled to handle audio/video satellite or terrestrial data, storing such data on disk, and/or displaying such data on a monitor, such as a television monitor.

The transport core 602 within the ASIC 640 may comprise suitable circuitry, logic and/or code that may be enabled to pre-process audio/video data received from an ASIC interface, for example, or from a source such as memory (e.g., data retrieved from memory). The security top 604 within the transport core 602 may be enabled to perform security key calculation functions inside the transport core 602, such as any functions necessary to achieve strong pairing between a security key and a destination module.

The internal key generator 601 may comprise suitable circuitry, logic and/or code that may be enabled to generate security keys. Security keys may also be generated by a key generator outside the ASIC 640 and may then be communicated to the external key interface 603 via the connection 604.

The key serializers 607, 611, 613, and 615 may comprise suitable circuitry, logic and/or code that may be enabled to pair a security key and its associated destination module address with a security command to form a security key sequence, and subsequently transmit the prepared security key sequence. For example, the key serializer 611 may be enabled to transmit a 256-bit security key and the security key may be calculated 32 bits at a time. The key serializer 611, therefore, may be enabled to hold intermediate 32-bit portions until the entire 256-bit security key may be available and ready for transmission.

The address portion in each security key sequence may be configured via register writes from the CPU 638. The CPU register writes may be communicated to the key serializer 611 via the register control 606. The security command within a security key sequence prepared by a key serializer may be determined by either CPU register writes, or by hard coding of values based on the way the security key was calculated or generated. In instances when a segment of the security command may be hard coded, a register write may not be utilized to specify the value of that segment. For example, if a security key may be received externally via the external key interface 603, two bits in the security key command may be hard coded to indicate the source of the security key, i.e., an external source.

The key serializers 607, 611, 613, and 615 may utilize security keys generated by the internal key generator 601 or security keys received externally via the connection 604 and the external key interface 603. The key serializers 607, 611, 613, and 615 may be separated according to the security clients that they may be enabled to service. For example, the external security clients 621, 623, and 625 may be involved in different operations. The external security client 621 may operate specific software, for example, related to disk drive operation, or to client security key revocation. The external security clients 623 and 625 may be involved in different operations, which may not require sharing of key serializer resources. Therefore, for ease of software implementation, for example, each of the security clients 621, 623, and 625 may utilize its own key serializer, 611, 613, and 615, respectively.

Similarly, the internal security clients 608, 610, and 612 may require sharing of key serializer resources and, therefore, a single key serializer 607 may be provided to service the internal security clients 608, 610, and 612. In one aspect of the invention, a key serializer may be shared by several deserializers. In this case, a destination address field may be utilized to specify an intended destination of a key. A destination address may also be utilized in a configuration where one key serializer may be connected to only one key deserializer.

In various aspects of the invention, the key serializer 607 may be implemented as a plurality of separate serializers, and the key serializers 611, 613, and 615 may be implemented as a single serializer, for example. A security command word may be utilized to invalidate a key transmitted in a prior event. In this case, a security command and an address may be specified. A transmission may be received by a key deserializer, and may be utilized to invalidate a key that may have already been transmitted to the deserializer.

Each of the security clients 608, 610, 612, 621, 623, and 625 may be utilized for encrypting and/or decrypting of data. In addition, each of the security clients 608, 610, 612, 621, 623, and 625 may comprise key deserializers 626, 628, 630, 632, 634, and 636, respectively. The key deserializers may comprise suitable circuitry, logic and/or code that may be enabled to receive a security key sequence transmission from a key serializer, and to recover (separate) the security key and the corresponding security command (or rule). After the security key and the security command are separated from the security key sequence in the deserializer, the security client may examine the security command and may determine a manner in which the security key may be utilized and which destination module associated with the security client may utilize it. For example, a destination module associated with a security client may be enabled to utilize only internally generated security keys, for example, security keys that may be generated by the internal key generator 601. If the security command indicates, for example, that the deserialized security key was calculated using an external key generator, the security client may then indicate that the received security key may not be utilized.

In this way, strong pairing between the security key and the destination module may be accomplished, and may allow for secure control of key revocation commands between the ASIC 640 and a client.

Security clients within the ASIC 640 may be divided into internal security clients and external security clients. The internal security clients 608, 610, and 612 may be utilized for destination modules within the transport core 602, and the external security clients 621, 623, and 625 may be utilized for destination modules outside the transport core 602.

The internal security clients 608, 610, and 612 may be utilized for decrypting received data from a content provider, for example. Encrypted data may be received from a satellite or from a terrestrial cable connection, for example. In this way, the internal security clients 608, 610, and 612 may be utilized for the initial decryption of data received by the ASIC 640. In addition, the internal security clients 608, 610, and 612 may be utilized for receiving and/or transmitting security keys that may be required by destination modules within the transport core 602. The ASIC 640 may utilize multiple internal security clients in order to handle several encrypted data streams. For example, internal security clients 608 and 610 may be utilized to decrypt two encrypted video streams received by the ASIC 640, and the internal security client 612 may be utilized for decrypting a received audio stream.

The external security clients 621, 623, and 625 may be utilized in connection with destination modules that may be outside of the transport core 602. Each of the external security clients 621, 623, and 625 may be enabled to store more than one security key for different operations. In this regard, a security key table may be associated with each external security client. The destination module address portion of each deserialized security key sequence may be used to determine which part of the key table, or which destination module, to populate with the received security key transmission. The external security clients 621, 623, and 625 may also be utilized for any other encryption and/or decryption operation that may be required after received data is decrypted. Once received and encrypted data has been decrypted within the ASIC 640 with the help of a security key, there may be requirements of how a decrypted data may be stored into memory, how it may be stored on a hard disk, and how it may be transmitted over a network. For example, a subsequent encryption may be required prior to storing into memory, storing on a hard drive, or transmitting over a network. All such requirements related to the handling of data may be implemented via the security command transmitted together with the security key.

By utilizing the external security clients 621, 623, and 625, rather than the internal security clients 608, 610, and 612, hardware resources utilized to transmit a security key within the ASIC 640 may be minimized. In this way, because of decreased physical distance between the external security clients 621, 623, and 625, and other blocks within the ASIC 640, security key handling may be more efficient. The external security clients 621, 623, and 625 may also be utilized for additional system applications, for example, if decrypted data has to be stored on a disk. An external security client may then be utilized to encrypt data prior to storage. Each of the security clients within the ASIC 640, internal or external security clients, may have a different usage for a security key, and its associated security command, that have been calculated for it.

The key route and control logic 605 may be coupled to the internal key generator 601 and the external key interface 603, and may comprise suitable circuitry, logic and/or code for calculating security keys that are available for use. For example, a set of rules may be associated with the permissible ways to use security keys received from the internal key generator 601 or the external key interface 603, and a set of rules determining which destination module security keys may be sent to depending on the way the security key was generated. For example, the key route and control logic 605 may determine which key serializer within the ASIC 640 may be utilized for a specific key obtained from the external key interface 604.

The key route and control logic 605 may also provide storage for intermediate results generated by the internal key generator 601 or the external key interface 603 in the security key generation process. In addition, the key route and control logic 605 may receive status signals back from the key serializers 607, 611, 613, and 615. For example, a serializer may be in the process of transmitting a security key. During the transmission process, the serializer may also transmit a status message informing the key route and control logic 605 that a new security key may not be currently transmitted. After the serializer completes transmission of the security key, a signal may be sent back to the key route and control logic 605 indicating availability to receive a new key for transmission.

The register control 606 may be coupled to the CPU 638 and may comprise suitable circuitry, logic and/or code enabled to configure the internal key generator 601, the external key interface 603 and the key route and control logic 605 to properly complete a security key generating and serializing operation. The register control 606 may configure the operation of the internal key generator 601 before an operation may be done. It may also be utilized to initiate generation of a new key. In addition, the register control 606 may be coupled to the CPU 638 inside the ASIC 640, and it may execute instructions on behalf of the CPU 638 for generation of a security key, or an intermediate security key used for subsequent security key generation, for example. The CPU 638 may provide the address portion of a security key sequence which may then be utilized by a security key serializer.

In operation, a security key may be generated by the internal key generator 601. A security key may also be generated by a source external to the ASIC 640 and then made available to the ASIC 640 via an interface, for example, the external key interface 603 and the connection 604. The security key may be assembled via the key route and control logic 605 and may then be distributed to the appropriate destinations via a specialized security key transmission bus, utilizing the transport key serializer 607, and/or key serializers 611, 613, and/or 615. The key serializers 607, 611, 613, and 615 may be utilized to pair the security key and its associated destination module address with a security command to obtain a security key sequence. The key serializers 607, 611, 613, and 615 may then communicate the security key sequence to an internal security client, such as clients 608, 610, and 612, and/or an external security client, such as clients 621, 623, and 625. The key serializers 611, 613, and 615 may comprise, for example, a MEM-MEM key serializer, a MEM-IDE key serializer, and/or a HDMI key serializer. The external security clients 621, 623, and 625 may comprise, for example, a MEM-MEM client, a MEM-IDE client, and/or a HDMI security client. U.S. application Ser. No. 10/414,844 filed Mar. 14, 2003 discloses a MEM-3DES-MEM system and is hereby incorporated herein by reference in its entirety. U.S. application Ser. No. 10/414, 575 filed Mar. 14, 2003 discloses a MEM-3DES-IDE system and is hereby incorporated herein by reference in its entirety.

In an embodiment of the present invention, strong pairing between a security key and a destination may be achieved by pairing a security command (or a data-structure) with the security key and its associated security address to form a security key sequence. The security key sequence may then be transmitted to a destination client. The destination module may then utilize the security key and proceed based on control information contained in the attached data-structure. The data structure may comprise control information, such as, for example, the algorithm type associated with the destination module, revocation commands, size of the security key, and source of the security key. When a destination module receives a security key, it may compare the attached security command (or data-structure) with the selected algorithm configuration. If the algorithm configuration does not match information for the security key, the destination module may report an error and/or initiate an action. For example, the destination module may report corruption of data, and/or initiate an action to resolve the corrupted data. This technique may be utilized to eliminate revocation denial of service or other attacks from hackers or unauthorized users.

In an embodiment of the present invention, a security key, its associated destination module address, and the tagged security command (or data-structure) may be transmitted serially to the destination module via a specialized serial bus, for example.

Figure 7:
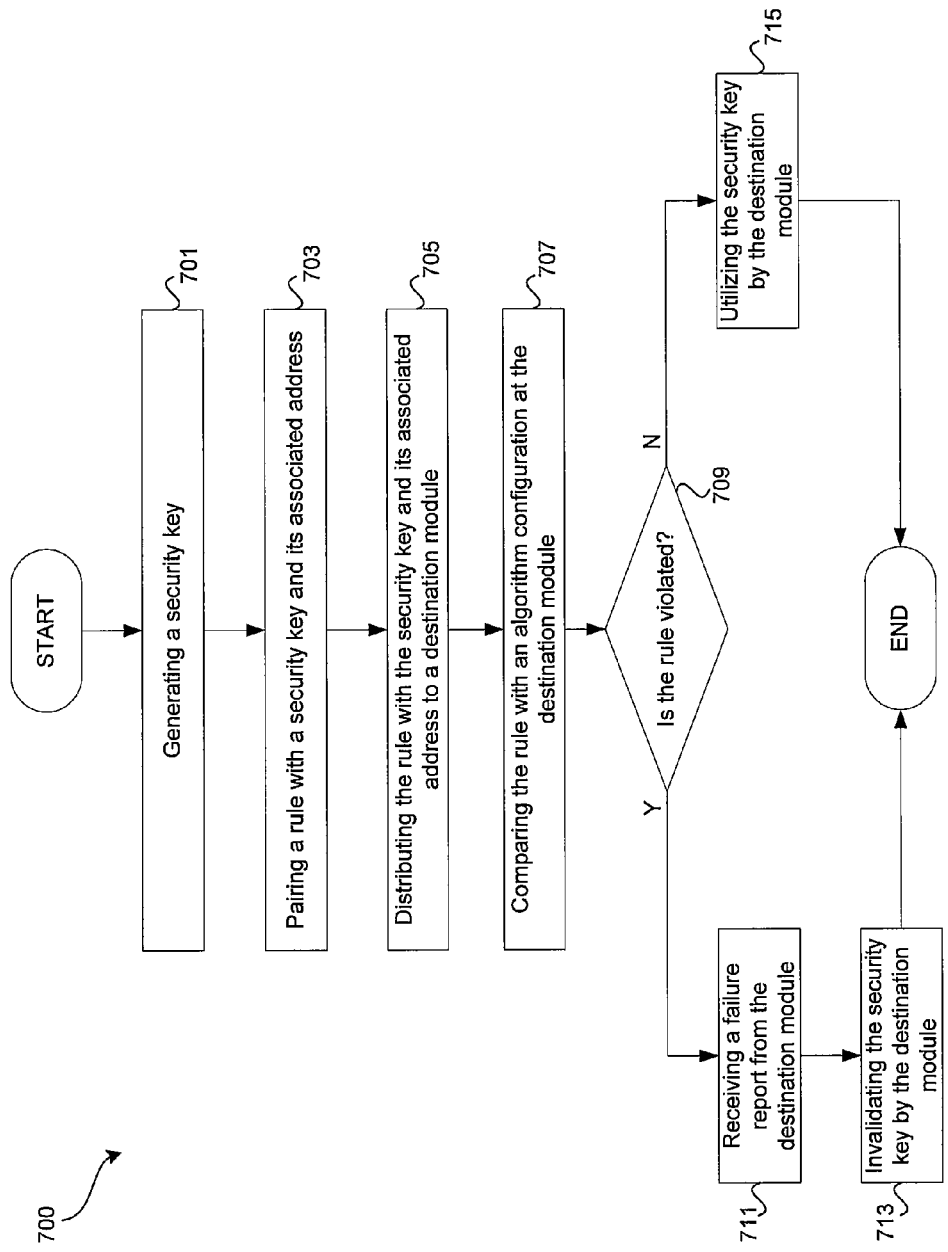
FIG. 7 is a flow diagram of a method for security key transmission with strong pairing to destination client, in accordance with an embodiment of the invention.

FIG. 7 is a flow diagram of a method 700 for security key transmission with strong pairing to destination client, in accordance with an embodiment of the invention. At 701, a security key may be generated. For example, a security key may be generated by an internal key generator on a chip, and/or by an external key generator outside the chip utilizing security key transmission with strong pairing. In addition, a security key may be associated with a destination module address indicating a destination module within or outside the chip. At 703, the generated security key and its associated destination module address may be paired with a rule. The rule may comprise a security command, such as a security key revocation command and/or a data-structure.

At 705, the rule, together with the security address and its associated destination module address, may be distributed to a destination module. At 707, the rule may be compared with an algorithm configuration at the destination module. At 709, it may be determined whether the rule has been violated. If the rule has been violated, at 711, a failure report may be received from the destination module. At 713, the security key may be invalidated by the destination module. If the rule has not been violated, at 715, the security key may be utilized by the destination module.

Figure 8:
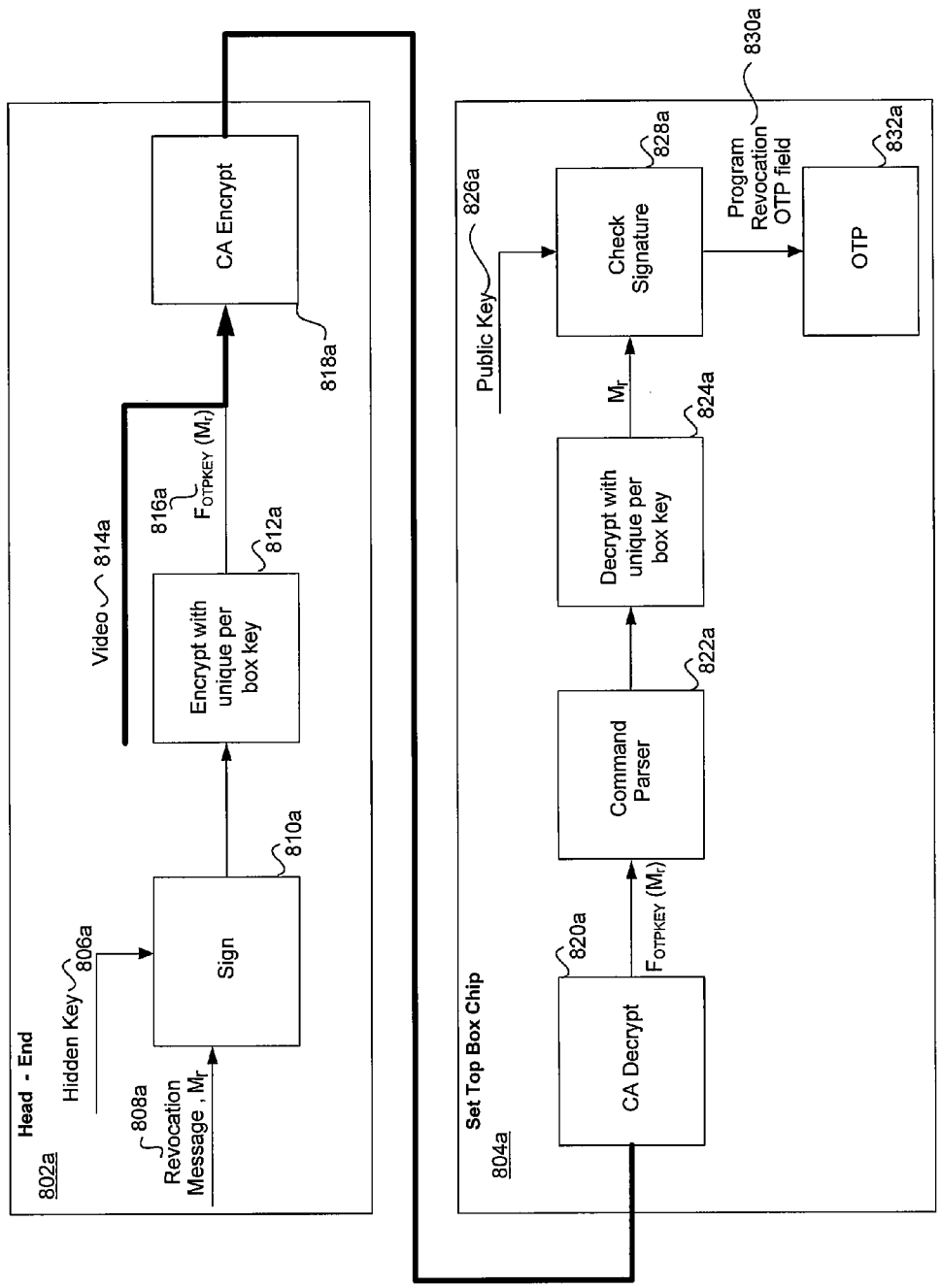
FIG. 8 is a block diagram illustrating an exemplary system for preventing revocation denial of service attacks, in accordance with an embodiment of the invention.

FIG. 8 is a block diagram illustrating an exemplary system for preventing revocation denial of service attacks, in accordance with an embodiment of the invention. Referring to FIG. 8, the exemplary system may comprise a head-end 802a and a set-top box chip (STBC) 804a. The head-end 802a may comprise a signing block 810a, an encryption block 812a, and a conditional access (CA) encryption block 818a. The signing block may sign a revocation message with a hidden key 806a. The encryption block 812a may encrypt with a box OTP key, for example.

The STBC 804a may comprise a CA decryption block 820a, a command parser 822a, a decryption block 824a, a signature verification block 828a, and an OTP 832a. The decryption block may be enabled to decrypt using a box OTP key. The signature verification block may be enabled to use a public key 826a for verification.

Set top box chips, such as the STBC 804a, may use secure keys and/or code for use on an end user's system, for example. In instances when the STBC 804a may be compromised or hacked and this information becomes known to an unauthorized entity, the authorized entity may then revoke the code or the secure keys used by the STBC 804a. Revoking the code may be performed by, for example, revoking the keys used to sign that code, so that only a single key revocation may be used to make the system unusable.

In an exemplary embodiment of the invention, revoking the keys may be performed by programming OTP bits which are dedicated as a key ID. The system may compare the key ID burned into the OTP 832a to the key ID in a local memory, such as a flash memory. As long as the key ID burned into the OTP 832a is less than the key ID programmed into flash, the key may be considered valid—that is, new key values may be written to the flash memory with new key IDs and they may be considered valid. However, when the authorized entity wishes to revoke a key, it may issue a command to change the OTP 832a value to be equal to or greater than the key ID in flash. In such instances, the key may be revoked and may no longer be used to sign code.

However, this mechanism may be used by a hacker in a denial-of-service attack, or it may result from buggy code which may inadvertently program a bit in the OTP that makes it appear that the key ID has become greater than the value stored in flash. To prevent such occurrences, in another embodiment of the invention, the key revocation command 808a may be signed by the head-end 802a using, for example, the signing block 810a and the hidden key 806a. The signature may be placed in a special packet which may be sent along with the video signal 814a and audio information, and may be written to a security processor in the set top box. The security processor may need to verify and confirm a valid signature before the OTP revocation field may be allowed to be programmed.

In some instances, a hacker may learn the signature by watching a box go through a legitimate revocation sequence. Thus learned, the signature may be applied to revoke keys of other boxes illegitimately, since the keys across multiple boxes will be the same (and hence their signatures will be the same). To prevent this from occurring, the key signature may then be further encrypted with the OTP key, an OTP key derivative, or a unique device or set-top box key, in order to provide uniqueness. The head-end 802a may sign the message which revokes the key, then may encrypt it with the OTP key (or a derivative key) of the STBC 804a whose key is being revoked. Then, if a hacker learns this revocation command by monitoring a legitimately revoked box, the hacker may not be able to use this information to revoke keys of other boxes.

In instances when a hacker denies a revocation command, the STBC 804a may be compromised, which may be known by the authorized entity. However, the hacker may then interfere with the revocation command, so that the STBC 804a may continue to operate normally. In such instances, the hacker attack may be defended by incorporating a hardware command parser, such as the command parser 822a in the STBC 804a. The command parser 822a may be enabled to monitor the incoming stream and identify special commands from the head-end 802a. The head-end 802a may communicate revocation commands via encrypted and signed messages within the actual video data 814a, so they may be very hard to interfere with. The command parser 822a, which may comprise a hardware block, may not be subject to the same types of hacks as would be the main CPU in the system, and it may be difficult to modify. The command parser 822a may then continue to monitor the video streams for special revocation messages. Since the hacker must continue to connect the set-top box to the incoming stream in order to receive video, the hacker may be unable to deny the revocation commands. In this regard, the revocation command may be received by the STBC 804a as desired.

The invention may comprise a hardware mechanism that may be utilized to verify the validity of a revocation command. The message received from the source, whether it be from a legitimate head-end source or a hacker, may be required to contain the hidden key of the key that is being revoked, or the hidden key of a key which itself was used to verify the public key being revoked. Thus, criteria may be met before any changes may occur in the set-top box chip 804a.

A period of time over which a particular set of parameters or keys may be considered valid may be defined as an epoch. A trusted authority may be defined as one that may possesses the set of parameters for a given epoch. In instances when a valid revocation command is executed, the system may proceed to another epoch, and may not return to the previous epoch, further enhancing security.

In an embodiment of the invention, a method and system are disclosed for receiving and decrypting a command for revoking a secure key utilizing a hidden key 826a, and revoking the security key upon successful verification of a signature. The received command for revoking the secure key may comprise a key ID that is unique to a specific set-top box. The secure key may be encrypted with an encryption key that may be unique to a specific set-top box. A key corresponding to the command for revoking the secure key may be stored in a one-time programmable memory 832a, compared to a reference, and the security key may be revoked based on the comparison. The reference may be stored in the OTP 832a. The key command for revoking the secure key may be parsed from a transport stream utilizing a hardware parser 822a.

In another embodiment of the invention, a method and system may also comprise generating a command for revoking a secure key. The command for revoking the secure key may be encrypted and signed utilizing a hidden key 806a and may comprise a key ID that is unique to a specific set-top box.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus enabled for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for signal processing, the method comprising:
   in a secure communication system in an integrated circuit:
   receiving an encrypted transport stream;
   decrypting said encrypted transport stream;
   extracting from said decrypted transport stream, a command for revoking a secure key, wherein said secure key is encrypted;
   decrypting said command for revoking said secure key utilizing a hidden key;
   verifying a signature of said decrypted command for revoking said secure key; and
   revoking said secure key upon successful verification of said signature.

2. The method according to claim 1, wherein said secure key is signed.

3. The method according to claim 1, wherein said command for revoking said secure key comprises a key ID that is unique to a specific set-top box.

4. The method according to claim 1, wherein said secure key is encrypted using an encryption key that is unique to a specific set-top box.

5. The method according to claim 1, further comprising storing a revocation key corresponding to said command for revoking said secure key in a one-time programmable memory.

6. The method according to claim 5, further comprising comparing said stored revocation key with a reference.

7. The method according to claim 6, further comprising revoking said secure key based on said comparison.

8. The method according to claim 6, wherein said reference is stored in said one-time programmable memory.

9. The method according to claim 1, further comprising parsing said command for revoking said secure key from said decrypted transport stream.

10. The method according to claim 1, further comprising parsing via hardware said command for revoking said secure key from said decrypted transport stream.

11. A method for signal processing, the method comprising:
    generating a command for revoking a secure key, wherein said secure key is encrypted;
    encrypting said command for revoking said secure key utilizing a hidden key;
    signing said encrypted command for revoking said secure key;
    combining said signed and encrypted command with video data being transmitted to a secure communication system; and
    encrypting said combined video data and said signed and encrypted command.

12. The method according to claim 11, wherein said command for revoking said secure key comprises a key ID that is unique to a specific set-top box.

13. The method according to claim 11, wherein said secure key is encrypted using an encryption key that is unique to a specific set-top box.

14. A system for signal processing, the system comprising:
    one or more circuits for receiving an encrypted transport stream, said one or more circuits configured to:
    decrypt said encrypted transport stream;
    extract from said decrypted transport stream, a command that revokes a secure key, wherein said secure key is encrypted;
    decrypt said command for revoking said secure key utilizing a hidden key;
    verify a signature of said decrypted command for revoking said secure key; and
    revoke said secure key upon successful verification of said signature.

15. The system according to claim 14, wherein said secure key is signed.

16. The system according to claim 14, wherein said command for revoking said secure key comprises a key ID that is unique to a specific set-top box.

17. The system according to claim 14, wherein said secure key is encrypted using an encryption key that is unique to a specific set-top box.

18. The system according to claim 14, wherein said one or more circuits are further configured to store a revocation key corresponding to said command for revoking said secure key in a one-time programmable memory.

19. The system according to claim 18, wherein said one or more circuits are further configured to compare said stored revocation key with a reference.

20. The system according to claim 19, wherein said one or more circuits are further configured to revoke said secure key based on said comparison.

21. The system according to claim 19, wherein said reference is stored in said one-time programmable memory.

22. The system according to claim 14, wherein said one or more circuits are further configured to parse said command for revoking said secure key from said decrypted transport stream.

23. The system according to claim 14, wherein said one or more circuits parses via hardware, said command for revoking said secure key from said decrypted transport stream.

24. A system for signal processing, the system comprising:
   one or more circuits configured to:
   generate a command for revoking a secure key, wherein said secure key is encrypted;
   encrypt said command for revoking said secure key utilizing a hidden key;
   sign said encrypted command for revoking said secure key;
   combine said signed and encrypted command with video data being transmitted to a secure communication system; and
   encrypt said combined video data and said signed and encrypted command.

25. The system according to claim 24, wherein said command for revoking said secure key comprises a key ID that is unique to a specific set-top box.

26. The system according to claim 24, wherein said secure key is encrypted using an encryption key that is unique to a specific set-top box.

27. The system according to claim 24, wherein said secure communication system comprises a set-top box.

28. The method according to claim 11, wherein said secure communication system comprises a set-top box.

* * * * *